Sept. 14, 1926.
S. H. PLUM, 2D., ET AL
SHEET GUIDING MEANS
Filed Sept. 5, 1925
1,599,789
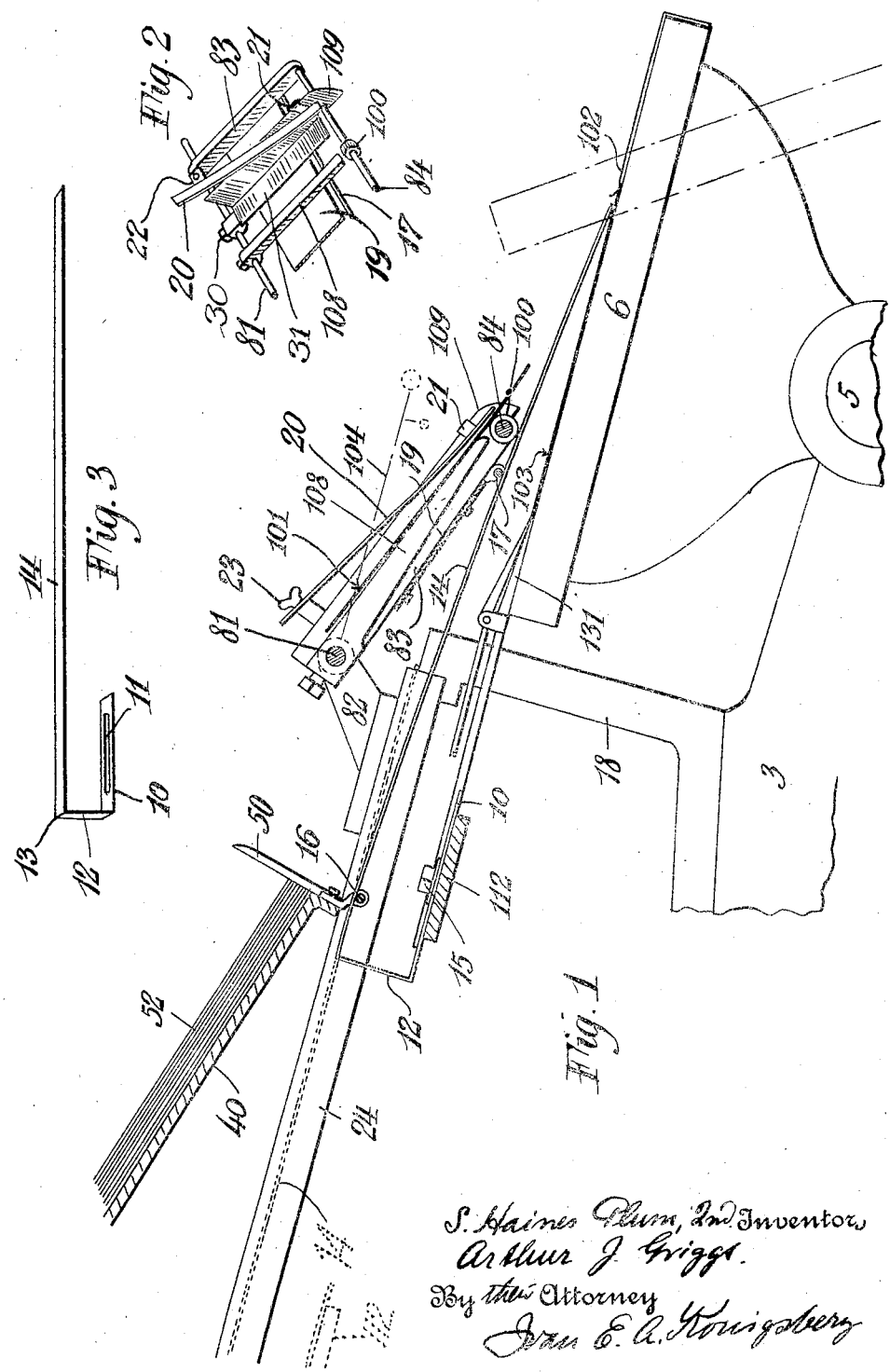

Patented Sept. 14, 1926.

1,599,789

UNITED STATES PATENT OFFICE.

S. HAINES PLUM, 2D, OF MADISON, AND ARTHUR J. GRIGGS, OF NEWARK, NEW JERSEY, ASSIGNORS TO AMERICAN TYPE FOUNDERS COMPANY, A CORPORATION OF NEW JERSEY.

SHEET-GUIDING MEANS.

Application filed September 5, 1925. Serial No. 54,638.

This invention relates to improvements in sheet guiding means. More particularly the invention relates to sheet guiding means to be used in connection with automatic feeders for platen presses, although not especially limited thereto.

The object of the invention is to provide sheet guiding means whereby to guide the sheet to be printed in its path toward the platen and prevent it from contact with the previously printed sheet as the latter is delivered.

The invention is disclosed as applied to an automatic feeder of the type disclosed in the U. S. Patent No. 1,476,829 to L. E. Morrison, dated December 11, 1923, and is embodied in sheet guiding means as hereinafter described and as illustrated in the accompanying drawing in which—

Figure 1 is a side view, with parts in section and other parts removed, of parts of the feeding mechanism shown in the said patent.

Figure 2 is a perspective view with parts broken away illustrating certain elements of the invention shown in Figure 1.

Figure 3 is a detail view of one of the sheet guiding fingers.

In the present instance only so much of a printing press and its feeding mechanism is illustrated as is necessary for complete understanding of the invention. Referring to the drawing the printing press is of the well known Chandler & Price construction and is identified by the frame 3 and platen 6 which oscillates on the pivot 5. An automatic feeder is mounted on the press in accordance with the said patent and comprises suitable side brackets 18 which support a feed table 24. The paper 52 is placed on an inclined paper board 40 and rests against suitable stops 50.

The feed table 24 is provided with suitable brackets 82, only one of which is shown and a so-called transfer table is pivoted between the brackets 82 and comprises an upper shaft 81, side arms 83 and a lower roll off shaft 84.

The transfer table is further provided with paper supports 108 and side guides 109. The side guides 109 rest upon the roll off shaft 84 and have a horizontal flange portion 31 secured to the upper shaft 81 by a screw 30. The roll off shaft 84 may carry suitable rolls 100. It will be understood from the drawing that Figure 2 illustrates only one half of the transfer table and that in Figure 1 the transfer table is illustrated in section and with parts removed not necessary for the understanding of this invention.

The printed sheet is removed from the platen by means of a delivery gripper 131 suitably mounted on a reciprocating gripper base 112.

All of the foregoing described elements are identical with the corresponding elements shown in the said patent to which reference is hereby made for complete detailed understanding of the operation and construction of the several described parts. For purposes of ready reference to said patent, the reference numerals used herein are the same as those used in the patent.

The operation of the feeder may be briefly set forth as follows:—When the platen is in the sheet receiving position as shown in full lines, the transfer table is lowered and a sheet 101 is removed from the pile by any suitable automatic means or otherwise and placed upon the transfer table as shown, from which it then slides down onto the platen against the usual paper stops 102 to be printed as the platen now moves into printing position as shown in dotted lines. When the platen moves down the transfer table is automatically elevated into the position indicated by the dotted line 104 to permit the platen to pass.

As soon as the platen moves into sheet receiving position the delivery gripper 131 moves in over the platen and seizes the printed sheet 103 to remove the same in under the feed table after which it is deposited in the usual manner in a stacking box or jogging device not shown. This operation of the device and the means for accomplishing the same are all described in the patent aforesaid.

It has been found that certain kinds or grades of paper have a tendency to curl or buckle as it is fed to the platen and as a result therefrom the leading edge of the incoming sheet is apt to interfere with the delivery edge of the printed sheet or the sheet which is fed to the platen may so curl or buckle in its passage over the transfer table that it will not reach the platen in proper position to be registered and printed. To overcome this objectionable feature there is in accordance with the present invention provided sheet guiding fingers, usually two being employed and so arranged that they move with the gripper base and extend in over the platen to prevent the incoming sheet from interfering with the printed sheet. As seen in Figure 3 the sheet guiding finger is made of a thin, narrow piece of spring steel bent to form a relatively rigid base 10 having a slot 11 and then forming an upright relatively rigid supporting arm 12 bent at right angles to the base 10. At 13 the material is further bent to form a very much longer yielding guide finger 14 extending parallel to the base 10.

The guide finger is adjustably placed on the gripper base by means of a bolt 15 in the position shown in Figure 1 with the guiding portion 14 extending towards the platen.

The guiding finger is guided in its operation by two shafts, one of which 16 is suitably supported in fixed position on the paper support 40. The other shaft 17 is carried by a plate 19 secured to the side arms of the transfer table. Both shafts are rotatably mounted in their respective supporting means and extend across the feeder from side to side thereof.

In operation the guiding fingers are secured to the gripper base as shown with the guiding portion 14 above the supporting shaft 16. During operation as the gripper base moves towards the platen the guiding fingers will be moved in over the platen as shown and will be depressed or deflected by the shaft 17 which moves downward with the transfer table and thus not only prevents the guiding fingers from interfering with the transfer table but also deflects said fingers to form a downwardly inclined support at an angle to the surface of the platen and upon which support the incoming sheet 101 will slide down into printing position against the paper stops 102, thus preventing the leading edge of said sheet from contacting with the printed sheet.

As the platen now moves down into printing position the gripper base moves to the left in the drawing with the gripper and at the same time withdraws the paper guide fingers from the platen. At this time the transfer table is elevated so that the shaft 17 is removed from the guide fingers permitting the latter to be straightened out due to the inherent springiness of the material and as shown in dotted lines in the drawing the guide fingers move in under the feed table in a straight line.

It will, therefore, be seen that when a sheet is to be fed to the platen the guide fingers are moved in over the platen and automatically deflected to form a temporary support for said sheet and when the platen moves into printing position the sheet guiding fingers are withdrawn by the movement of the gripper base and at the same time permitted to straighten out and thus be automatically lifted from the platen and away from under the incoming sheet, it being understood by those skilled in the art that the delivery stroke of the gripper carriage is very rapid so that the guide fingers are rapidly removed from the platen so as not to interfere therewith.

As a further aid in feeding a sheet to the platen the transfer table is provided with inclined upper fixed sheet guides 20 which are suitably secured to the side guides 109 by means of a clip 21 and a lip 22 secured to said side guides by a wing nut 23. The upper fixed guides only one of which is shown form a channel between themselves and the base of the side guides and direct the leading edge of the sheet downwardly toward and into contact with the roll off shaft from which the sheet then passes onto the sheet guiding fingers and the platen. The upper fixed guides 20 are of particular assistance when thin sheets are being fed in that they prevent the edges of the sheet from being blown upwards from the transfer table.

It will be understood that the sheet guiding fingers 14 are suitably spaced on the gripper base and that two or more may be used if desired. That the guiding portion 14 constantly tends to straighten itself parallel to the base 10 and is only momentarily and gently deflected into guiding position over the platen. Also that by means of the slotted base 10 the guiding fingers may be positioned in proportion to the length of the sheet to be printed.

The foregoing is thought to fully explain the invention and the advantages to be derived therefrom. It has been found that the sheet guiding means as herein disclosed prevent the curling or buckling of the incoming sheet and serve both as a support for said sheet to more surely guide it into printing position and also serve as a means for separating the unprinted from the printed sheet when the platen is in sheet receiving position. While the invention has been disclosed with particular reference to the patent aforesaid it will nevertheless be understood that it is not exclusively limited thereto but may be used in connection with other printing mechanism.

We claim:—

1. In a press the combination with a platen, paper guiding means therefor comprising a plurality of paper guiding fingers adapted to be moved into operative position over the platen when the latter is in sheet receiving position, means for flexing said fingers when positioned as aforesaid to cause the same to form a guiding support downwardly inclined towards the surface of the platen, for a sheet which is being fed thereto and means for operating said fingers towards and away from the platen.

2. In a press the combination with a platen and paper transfer table as described, of a plurality of paper guiding fingers, means for moving the same in over the platen when the latter is in sheet receiving position and means on said transfer table for flexing said paper guiding fingers downwardly towards the platen to provide supports for a sheet to be passed from said transfer table to the platen.

3. In a press the combination with a platen and paper transfer table as described, of a plurality of paper guiding fingers, means for moving the latter towards and away from the platen and means on said paper transfer table for automatically positioning said paper guiding fingers in a downwardly inclined operative position with respect to the platen to guide a sheet passing from said transfer table to the platen.

4. In a press the combination with a platen, of means for separating a sheet being fed to the platen from a previously printed sheet to be removed from the platen, said separating means comprising a plurality of relatively long paper guiding fingers, means for moving said fingers in over the platen above a previously printed sheet thereon when said platen is in open position and means for bending said fingers downwardly towards the platen to support a sheet being fed thereto to separate it from said previously printed sheet on the platen.

5. In a press the combination with a platen, of means for separating a sheet being fed to the platen from a sheet about to be removed from the platen comprising a plurality of paper guiding fingers adapted to be positioned in over the platen above the sheet thereon at the moment the said movements of the sheet takes place, said paper guiding fingers forming a guiding support for the sheet which is being fed to the platen.

6. In a press the combination with a platen, paper guiding means therefor comprising a plurality of paper guiding fingers, means for moving the latter towards and away from the platen, means for flexing a portion of said fingers downwardly towards the platen as said fingers are being moved towards the same and means for supporting the flexed portion of said fingers when they are moved away from the platen.

7. Paper guiding fingers of the character described comprising a thin narrow piece of material bent at one end to form an upright portion and a base, the other relatively larger portion of said fingers being adapted to be momentarily flexed.

8. The combination with paper side guides comprising a relatively lateral portion and a relatively vertical portion, of paper guiding means comprising guiding members and means for attaching the same to the said paper side guides in an inclined position with respect to the said relatively lateral portion.

9. The combination with paper side guides comprising a relatively lateral portion and a relatively vertical portion, of paper guiding means comprising guiding members and means for detachably attaching the same to the said paper side guides to the said relatively vertical portion thereof in an inclined position with respect to the said relatively lateral portion.

S. HAINES PLUM, 2D.
ARTHUR J. GRIGGS.